US008522167B2

(12) United States Patent
Zhang et al.

(10) Patent No.: US 8,522,167 B2
(45) Date of Patent: Aug. 27, 2013

(54) RELATIONSHIP VISUALIZATION AND GRAPHICAL INTERACTION MODEL IN IT CLIENT MANAGEMENT

(75) Inventors: Chuanbo Zhang, Shanghai (CN); Huajun Luo, Shanghai (CN); Yue Chen, Shanghai (CN); Daniel D. Ward, Renton, WA (US); Justin K. Stanton, Redmond, WA (US); Chung Man Yiu, Bellevue, WA (US); Jie Du, Shanghai (CN); David C. James, Snohomish, WA (US); Leyu Feng, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 12/853,079

(22) Filed: Aug. 9, 2010

(65) Prior Publication Data

US 2012/0036484 A1    Feb. 9, 2012

(51) Int. Cl.
*G06F 3/048*    (2013.01)
(52) U.S. Cl.
USPC ........................................................... 715/853
(58) Field of Classification Search
None
See application file for complete search history.

(56) References Cited

U.S. PATENT DOCUMENTS

| 6,425,007 | B1 * | 7/2002 | Messinger | 709/224 |
| 6,636,250 | B1 * | 10/2003 | Gasser | 715/853 |
| 7,720,050 | B1 * | 5/2010 | Blank | 370/352 |
| 2004/0085347 | A1 * | 5/2004 | Hagarty et al. | 345/735 |
| 2007/0044032 | A1 * | 2/2007 | Mollitor et al. | 715/764 |
| 2007/0156706 | A1 | 7/2007 | Hayes | |
| 2009/0150887 | A1 | 6/2009 | Sanghvi et al. | |
| 2010/0275128 | A1 * | 10/2010 | Ward et al. | 715/744 |

OTHER PUBLICATIONS

PRTG Network Monitor 7 user manual, published by Paessler AG on Dec. 3, 2008.*
Author Unknown, "Configuration Manager", Retrieved May 27, 2010 (Copy Attached) http://www.microsoft.com/systemcenter/en/us/configuration-manager/cm-os-deployment.aspx.
Author Unknown, "Infoblox Orchestration Server", Retrieved May 27, 2010 (Copy Attached) http://www.infoblox.com/products/IBOS-Orchestration.cfm.
Author Unknown, "Microsoft System Center Configuration Manager (SCCM) Dashboard", Retrieved May 27, 2010 (Copy Attached) http://richfrombechtle.wordpress.com/2010/03/03/microsoft-system-center-configuration-manager-sccm-dashboard/.

(Continued)

*Primary Examiner* — William Bashore
*Assistant Examiner* — Hien Duong
(74) *Attorney, Agent, or Firm* — Workman Nydegger

(57) ABSTRACT

Displaying a hierarchy. A method includes identifying a set of nodes representing sites in a hierarchy. The set of nodes share one or more common characteristics not shared by any other nodes in the hierarchy. The method further includes determining that the set of nodes, as a set, meet a predetermined condition. As a result of the nodes sharing the one or more common characteristics not shared by any other nodes in the hierarchy and as a result of the set meeting the predetermined condition, the method further includes aggregating at least a portion of the set of nodes. The method further includes displaying in a graphical user interface a representation of the hierarchy including displaying the aggregated portion as a single entity in the hierarchy.

21 Claims, 7 Drawing Sheets

(56) References Cited

OTHER PUBLICATIONS

Bink, Steven, "Microsoft System Center Configuration Manager 2007 Dashboard", Apr. 8, 2010 (Copy Attached) http://bink.nu/news/archive/tags/SCCM+_2800_SMS_2900_/default.aspx.

Author Unknown, "Microsoft Office Visio 2007 Professional—System Center Operations Manager & System Center Configuration Manager Add-In", Retrieved May 27, 2010 (Copy Attached) http://www.microsoft.com/downloads/details.aspx?familyid=33A8EFDE-D72F-4BBB-A353-A1F2833FD2D5&displaylang=en.

Author Unknown, "Altiris Client Management Suite", Retrieved May 27, 2010 (Copy Attached) http://www.symantec.com/business/products/trialware.jsp?pcid=pcat_business_cont&pvid=cm_suite_1.

Author Unknown, "Red Wrangler", Retrieved May 27, 2010 (Copy Attached) http://www.redwrangler.com/learn-more.php.

* cited by examiner

RELATIONSHIP VISUALIZATION AND GRAPHICAL INTERACTION MODEL IN IT CLIENT MANAGEMENT

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

An enterprise may include a large number of interconnected computing systems. For example, some management systems may be configured to manage 5,000-300,000 client devices (including desktops, laptops and mobile devices) in very large enterprises. Each device belongs to a site, and sites are organized in a hierarchy (including central site, primary site and secondary site). There could be hundreds of primary sites in a hierarchy. Due to the large number of sites and clients in the sites, the relationships between various client devices may be very hard to understand.

In current enterprise management systems, information about individual systems in the enterprise is spread in multiple places organized in a hierarchy, but displayed as flat list view. It can be difficult for IT administrators to visualize the whole system hierarchy, especially the entire system hierarchy and latest hierarchy health information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method practiced in a computing environment. The method includes acts for displaying a hierarchy. The method includes identifying a set of nodes in a hierarchy. The set of nodes share one or more common characteristics not shared by any other nodes in the hierarchy. The method further includes determining that the set of nodes, as a set, meet a predetermined condition. As a result of the nodes sharing the one or more common characteristics not shared by any other nodes in the hierarchy and as a result of the set meeting the predetermined condition, the method further includes aggregating at least a portion of the set of nodes. The method further includes displaying in a graphical user interface a representation of the hierarchy including displaying the aggregated portion as a single entity in the hierarchy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments implement a new visualization model for enterprise and client management. Embodiments may be configured to display new representations of a hierarchy, display node health status and other context related information. In particular, some embodiments may be used to illustrate site hierarchies. Other embodiments may be applied to other hierarchies.

Embodiments may further include functionality for providing an interaction model to navigate through a hierarchy, browse and drill down into specific nodes to get health status, and perform other management tasks. Embodiments may use a graph to visualize and interact through a large hierarchy in IT enterprise and client management systems.

To simplify client representations, embodiments may implement aggregation nodes. Aggregation nodes are typically visually represented as a single entity, but represent a number of nodes greater than a single node. The single entity may be a single icon or graphic even though the single icon or graphic may illustrate a representation of multiple devices, such as multiple computer systems.

Aggregation nodes may be created and displayed when a collection or set of child nodes exceeds a given threshold. In one example embodiment, the threshold may be numerical. Thus when more than a given number (i.e. greater than or equal to a threshold) of nodes share one or more common characteristics, the nodes may be represented by a single entity.

The one or more common characteristics may be determined in a number of different ways. For example, in one embodiment, the common characteristic(s) may be determined based on user input of metadata about the single entity. Alternatively, programmatic determination may be used to define the common characteristic(s).

Embodiments may be implemented to allow a user to configure the single entity. For example, in one embodiment all nodes represented by the single entity can be configured by interaction with the single entity. In particular, user input can be received directed at the single entity. The user input can be used to then configure all nodes represented by the single entity according to the user input. Thus, the user input would be applied to all nodes rather than just a single node. In an alternative embodiment, the user may configure the single entity as a whole unit by interaction with the hierarchy map.

Figure 1A:
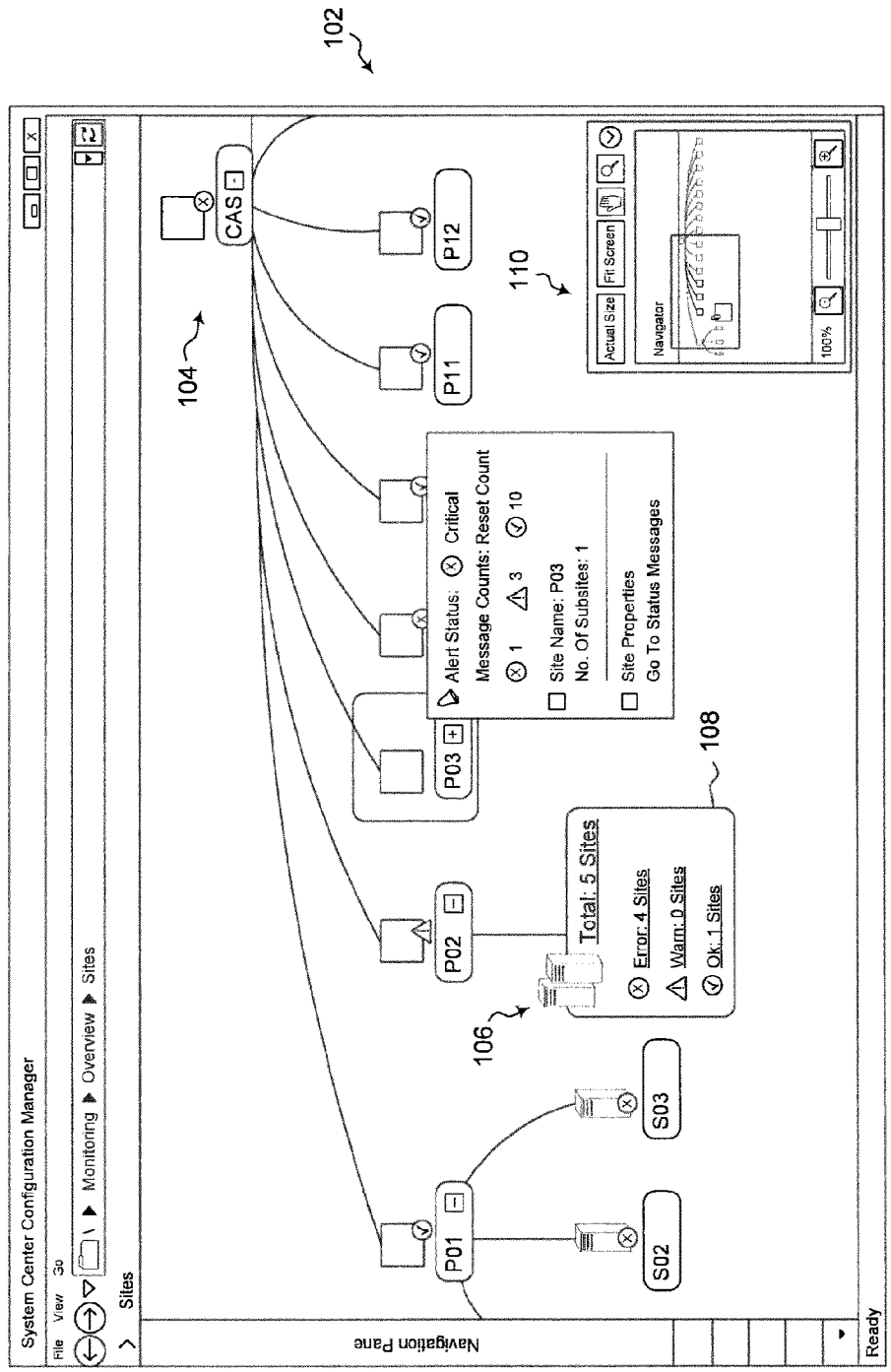
FIG. 1A illustrates a graphical user interface showing a hierarchy.
Figure 1B:
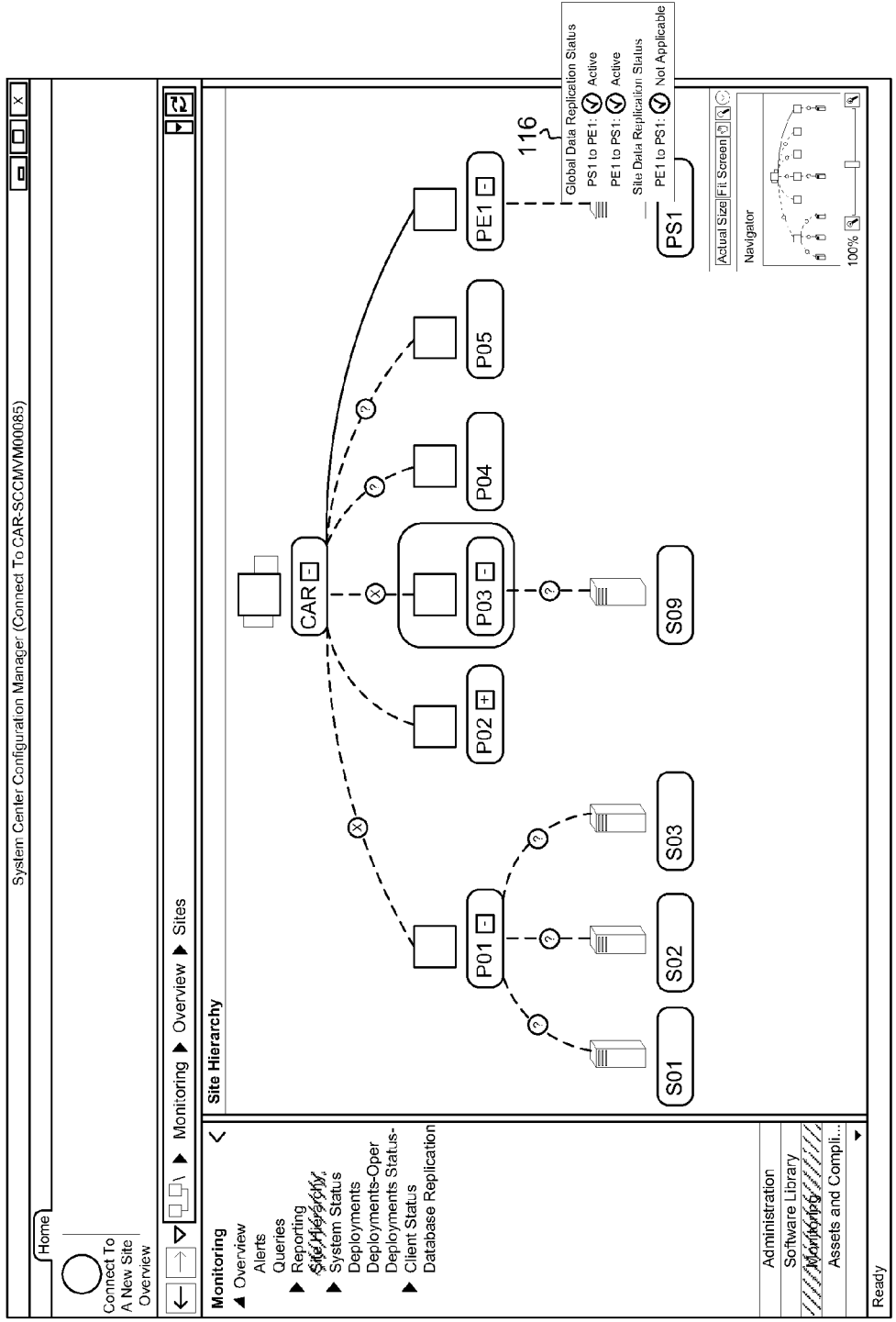
FIG. 1B illustrates a graphical user interface showing link status information for a connected link.
Figure 1C:
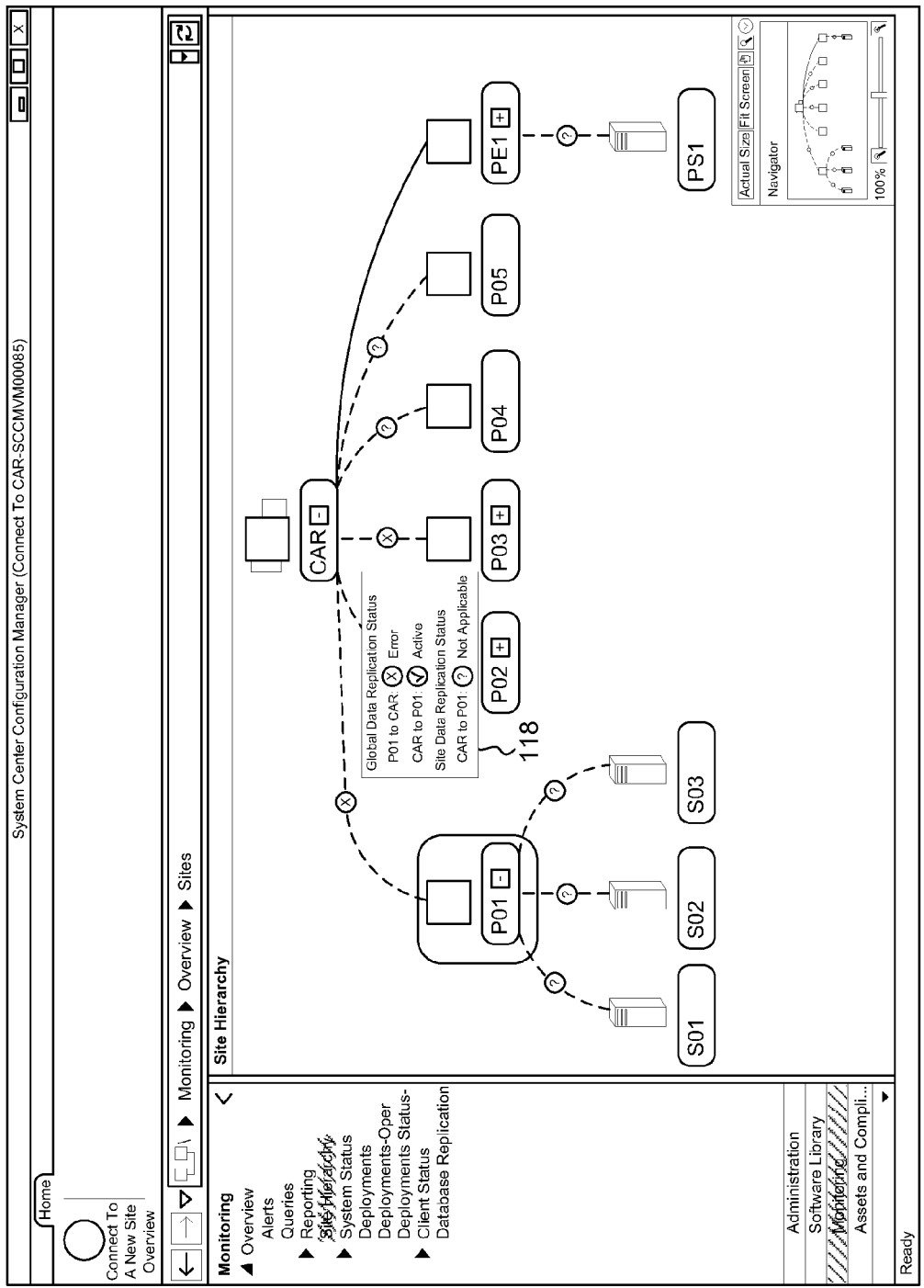
FIG. 1C illustrates a graphical user interface showing link status information for a link with errors.

An example is illustrated in FIG. 1A. FIG. 1A illustrates a user interface 102 in the form of a screenshot for a hierarchy visualization feature. An entire hierarchy 104 is organized as a tree, and each tree node has some information related to that node. Different icon and background color may be used to indicate the health status of the node. Embodiments may be implemented where hovering over a node will cause a tooltip to show more detail about the node. Embodiments may also be configured to display link status between nodes. For example, if a parent site has a problem connecting to one of its children sites, the link between these sites may display an error icon indicating the existence and optionally the nature of the problem. Thus, embodiments may include functionality for an administrator to interact with links. For example, FIGS. 1B and 1C illustrate information that an administrator may obtain by interacting with links between nodes. For example, a tooltip 116 (FIG. 1B) or 118 (FIG. 1C) will be shown by hovering the mouse on top of a link or on a right mouse click a link showing more context information. The tooltip 116 illustrates a functional link, while the tooltip 118 illustrates a link with errors. FIGS. 1B and 1C further illustrate that a functional link can be shown with a solid curve or line representing while a link with errors can be shown with a broken curve or line. In the bottom right of the user interface 102, a navigation dashboard 110 helps get an overview of the hierarchy 104 as well as enabling zooming in/out on specific parts of the hierarchy 104. For each node, context menus may be used to perform more tasks that are related to the node. FIG. 1A further illustrates expand and collapse interface elements associated with a node (shown as + and − respectively) when nodes are hierarchically below the node.

As noted, FIG. 1A illustrates a hierarchy 104 shown in a graphical user interface 102. The hierarchy 104 includes a number of nodes. Examples of single nodes are illustrated as P01, S02, S03, P02, P03, P11, and P12. Nodes S02 and S03 are illustrated as being hierarchically below node P01. FIG. 1A further illustrates an aggregation node 106. Aggregation node 106 represents a collection of 5 nodes that are hierarchically below node P02. Thus in this example, the common characteristic of the nodes represented by the aggregation node 106, is that they are each hierarchically below node P02. A threshold may be five nodes. Thus, nodes S02 and S03 are not represented as an aggregation node, because node P01 only has three nodes directly hierarchically below it.

While the aggregation node 106 represents 5 different nodes, the aggregation node may also have information associated with it summarizing information for the 5 different nodes. For example, the user interface 102 can display an information box 108 that displays summarized information. In particular, for each hierarchy node in hierarchy graph 104, an IT administrator could use an information box 108 in the form of a tooltip (or the like) to view the read-only information, like the health status of the node. The information box 108 indicates that 5 nodes are represented by the aggregation node 106. The information box further illustrates that errors have been reported by 4 of the 5 nodes, 0 of the nodes have reported warnings, and the 1 node is operating normally.

Context menus are also supported to make an action specific to a current selected hierarchy node. For example, a context menu may allow for a user to select interface elements to view properties, navigate to health status, etc.

Animation may be used for operations representing the hierarchical tree to make a better and lively user experience.

Embodiments may further include functionality for obtaining specific information about specific nodes represented by an aggregation node 106. For example, the information presented in the information box 108 may be hyperlinked. In this example, if a user selects the hyperlink associated with the four nodes reporting errors, information can be displayed about the individual nodes including specific information about the errors. This may be done by displaying a pop-up window which overlays the user interface 102, by replacing or expanding information in the information box 108 to display the additional information, or by any other appropriate method of displaying additional information. Embodiments may include functionality for switching views between an aggregation node and list view to drill down into child node detail.

In some embodiments, the user interface may include functionality for a user to dis-aggregate an aggregation node. For example, the user interface 102 may include functionality which allows a user to right-click (or some other user interface interaction with) an aggregation node, which then provides the user with an interface that allows the user to dis-aggregate the aggregation node 106. This would cause the user interface 102 to display individual nodes (similar to how nodes S02 and S03 are displayed) hierarchically below node P01.

Figure 2:
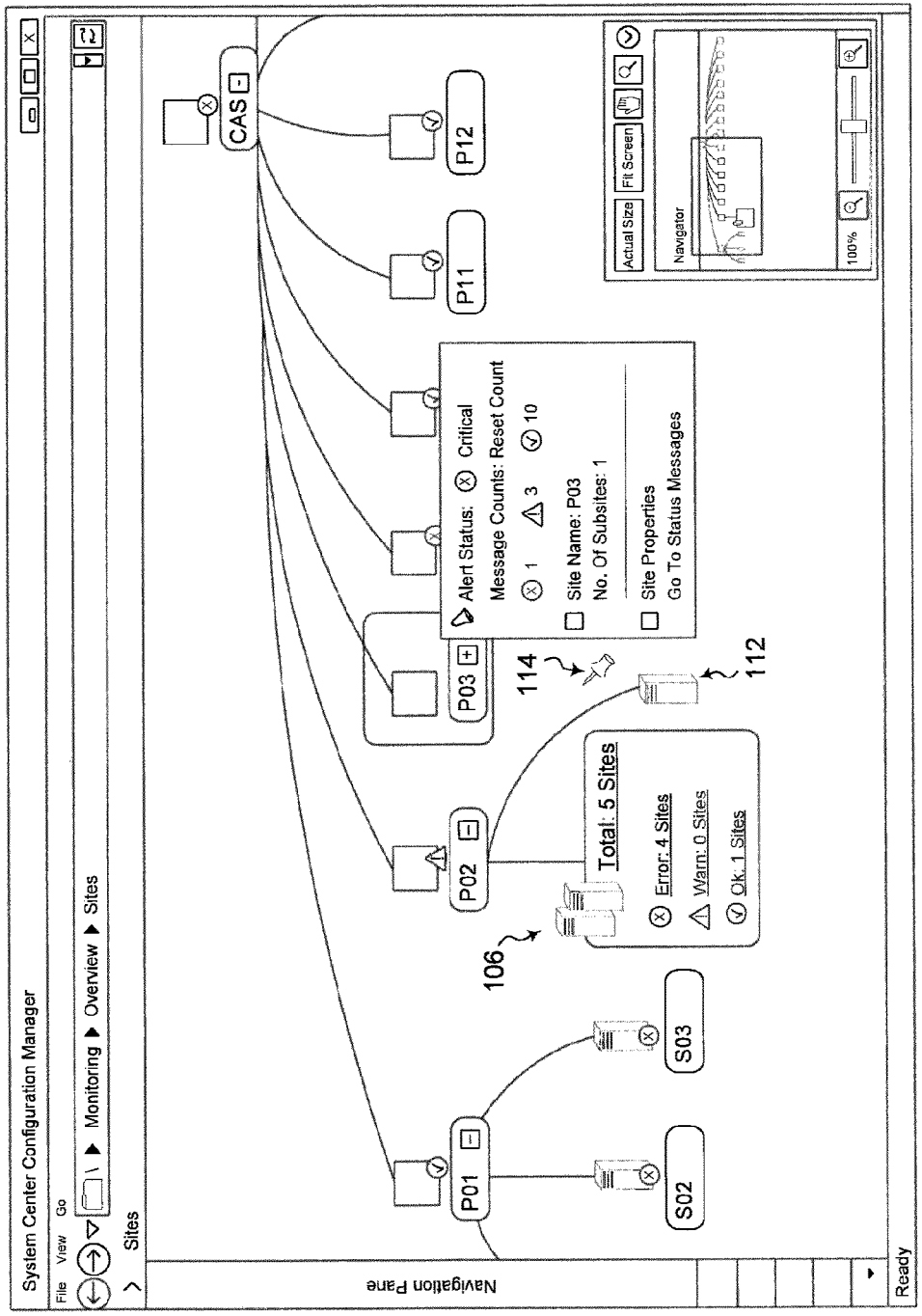
FIG. 2 illustrates a graphical user interface showing a hierarchy including graphical user interface elements for pinning node representations.

Referring now to FIG. 2, embodiments may include functionality to pin and unpin node representations. In particular, a node 112 can be pinned, such as by selecting a user interface element for pinning 114 associated with a node 112. In one embodiment, when pinned, and if the pinned node 112 would normally be subsumed by an aggregation node 106, the pinned node 112 can be shown along with an aggregation node 106 representing other members of the set to which the pinned node belongs. Embodiments may be implemented where the aggregation node 106 only represents nodes that are not pinned. In an alternative embodiment, the aggregation node 106 may also represent pinned nodes even though an alternate, individual representation node 112 is also shown.

Embodiments may further include functionality for displaying a hierarchy with geographic information. For example, referring now to FIG. 3, a user interface 302 is illustrated. The user interface illustrate a geographic map and shows a hierarchy 304 overlaid onto the map. The hierarchy 304 may show nodes in a similar fashion to that illustrated in FIGS. 1 and 2, except that positioning of the nodes on the map is based on the physical geographic locations of nodes which the nodes represent.

Various map providers may be used to obtain the maps for the user interface 302. For example, Bing® Maps available from Microsoft Corporation of Redmond Wash. includes interfaces that allow locations to be found by place name, addresses, and latitude and longitude coordinates. A user interface 302 may be able to interact with these configurable maps to locate representations on the maps. Information about the system locations can be obtained based on internet IP addresses, known locations of MAC addresses or IP addresses associated with a site, geo-location hardware, such as GPS devices or devices capable of determining location based on available internet hotspots, or other devices. Alternatively, information about system locations can be configured by and IT administrator or other manually providing such information.

While the preceding example illustrates the use of geographic maps, it should be appreciated that other maps may be used. For example, embodiments may overlay the hierarchy onto a map of a building that includes a number of systems represented by nodes of a hierarchy, where the nodes are represented on the building map in locations corresponding to approximately where systems are located. Alternatively, embodiments may illustrate a datacenter server rack map, where nodes representing systems in the datacenter server rack are overlaid onto the datacenter server rack map at locations corresponding to corresponding system locations.

Figure 3:
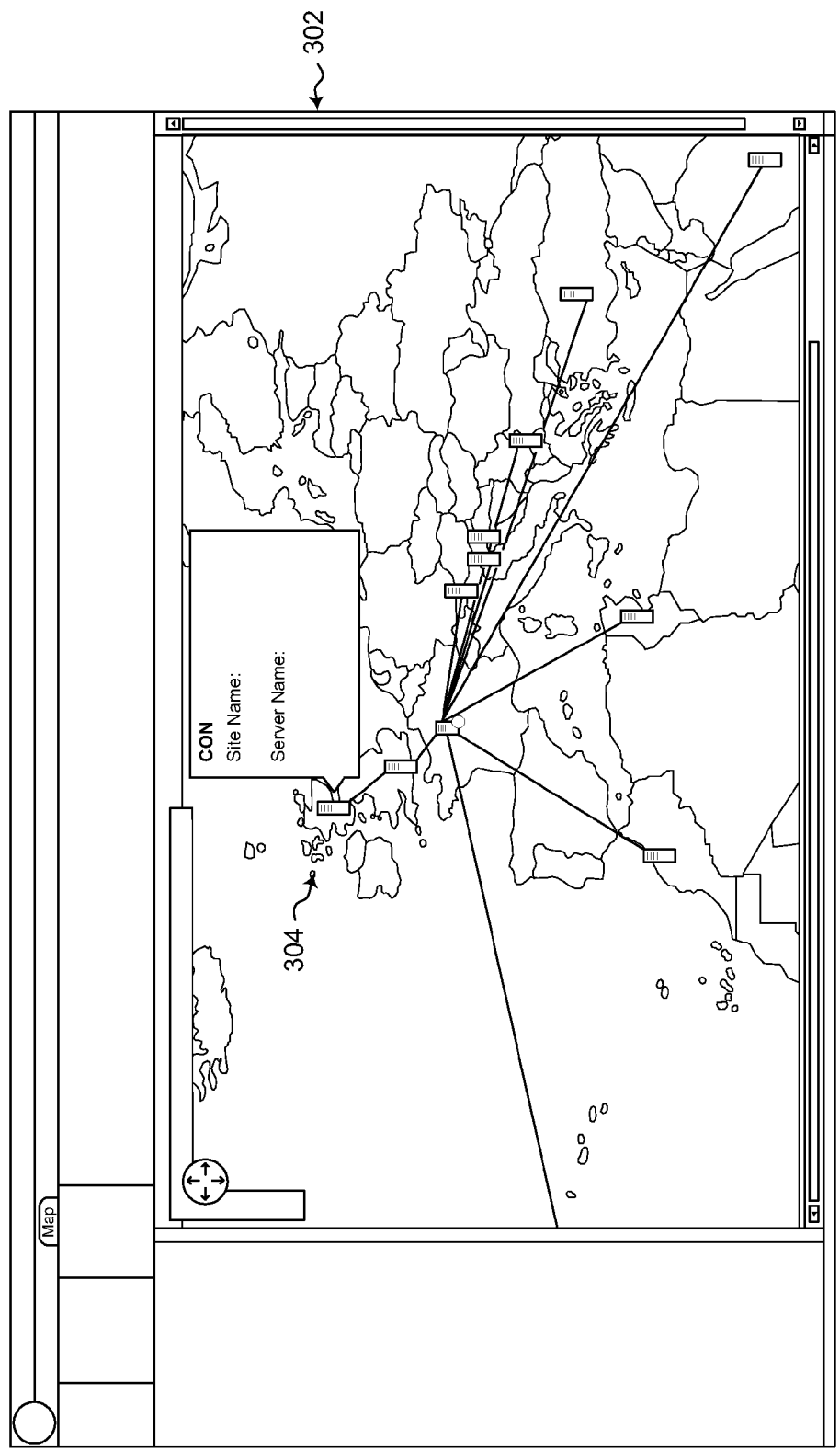
FIG. 3 illustrates a graphical user interface showing a hierarchy overlaid on a geographical map.
Figure 4:
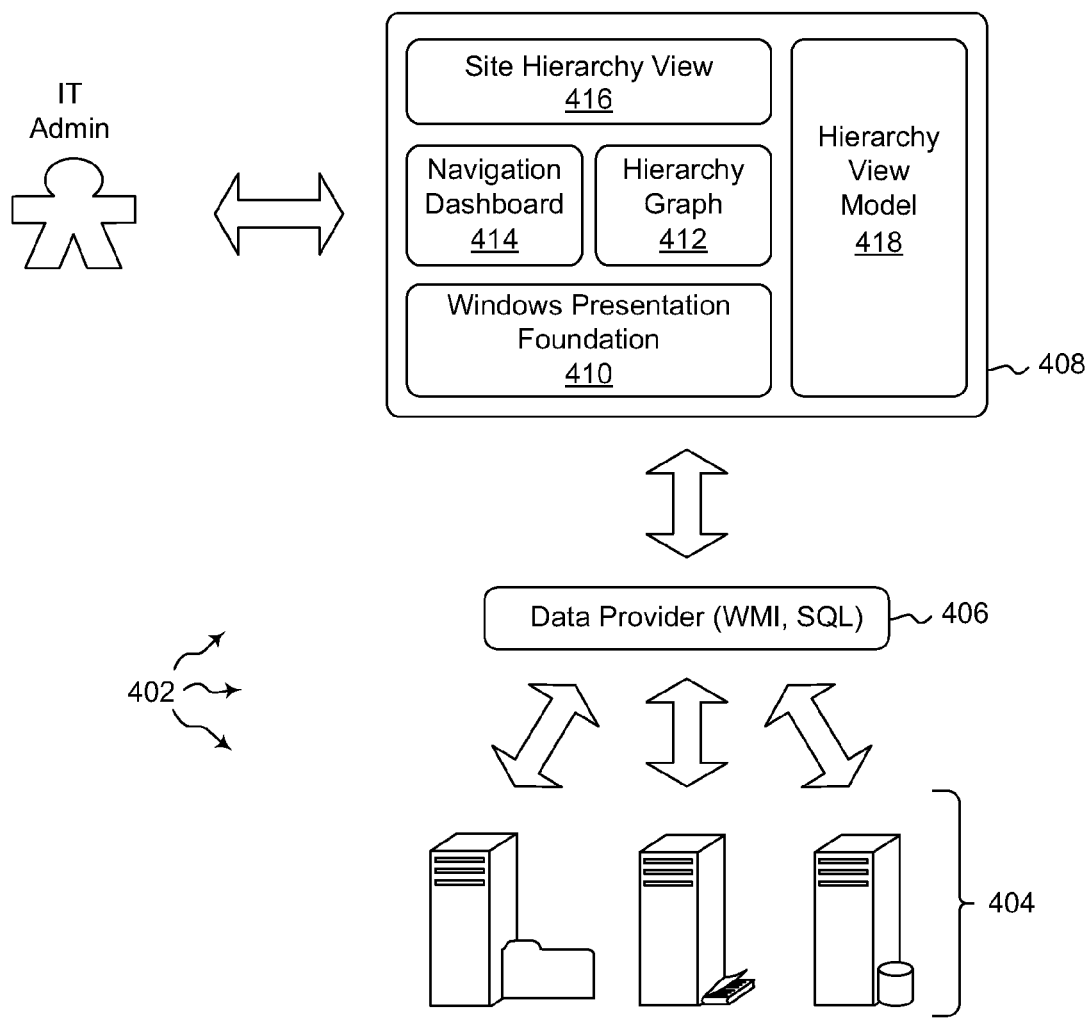
FIG. 4 illustrates a graphical representation of data provider layer elements and presentation layer elements.

As noted above, a hierarchical tree, such as tree 104 illustrated in FIG. 1A or 304 illustrated in FIG. 3 is used to visualize the hierarchy. FIG. 4 illustrates an architecture diagram for obtaining data and displaying models. When a tree 104 (FIG. 1A) needs to be loaded, embodiments may try to retrieve the hierarchy data from management provider. The data is re-organized in a hierarchy structure based on its parent or reporting information. Once the hierarchy is ready, the tree is displayed with user friendly animation.

FIG. 4 illustrates an architecture diagram 402 for a system that implements relationship visualization and graphical interaction models. In this architecture diagram 402, there are three major layers: a data source layer, a data provider layer and a presentation layer.

FIG. 4 illustrates a data source layer 404. The data source layer includes one or more data storage devices which store information about clients and services in a node. In client management space, there could be one or more various data sources, including databases, services, Active Directory® sources, file shares, etc.

FIG. 4 illustrates a data provider layer 406. The data provider layer 406 includes one or more computer modules used to abstract differences between data sources and thereby provide a consistent interface to the upper layers of the architecture, such as the presentation layer 408. In particular, the data source layer 404 may characterize data differently depending on a data source in the data source layer. For example, data in a database may be stored according to a schema for the database, whereas data stored in files shares may simply be stored as flat files or according to an XML schema. The data provider layer 406 can normalize the different data formats to a consistent data format that can be understood by the presentation layer 408. The data provider layer may include functionality for reading different data formats and translating the different formats to a consistent format.

Various different user interface (UI) technologies 410 could be used to implement the presentation layer 408. In one embodiment, the presentation layer is implemented using Windows Presentation Foundation® (WPF) available from Microsoft Corporation of Redmond Wash. Embodiments may use any appropriate UI technology to create a hierarchy graph 412. The hierarchy graph 412 is used to visualize the large data in a complex hierarchy as a graph. Examples of hierarchy graphs are illustrated previously herein in FIGS. 1, 2 and 3. FIG. 4 also illustrates the navigation dashboard 414. This helps a user to get the overview of the whole graph. Zoom in/out functionality may also be supported by the navigation dashboard 414. Additionally, in some embodiment, the navigation dashboard 414 can provide functionality to allow a user to focus on a specific area of the hierarchy. An example of the navigation dashboard 414 is illustrated at 110 in FIG. 1A.

FIG. 4 further illustrates the hierarchy view 416. The hierarchy view 416 includes an illustration of a hierarchy. As noted, the hierarchy may be illustrated in a number of different fashions including embodiments that use aggregation nodes. Further the hierarchy may be illustrated with geographic information.

FIG. 4 further illustrates a hierarchy view model 418. The hierarchy view model 418 includes view related operations and logic to facilitate interaction with hierarchy nodes.

Embodiment may further include functionality for auto-refreshing underlying data. In particular, embodiments can obtain data about nodes in the hierarchy on a periodic or other basis. The data can then be used to update the site hierarchy including creating aggregation nodes when appropriate conditions become met, updating node status, updating link status, etc.

While embodiments have illustrated very particular node relationships, it should be appreciated that other relationships can be displayed. For example, embodiments may illustrate server roles to site relationships, client to collection relationships, collection to collection relationships, application model dependency relationships, etc.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
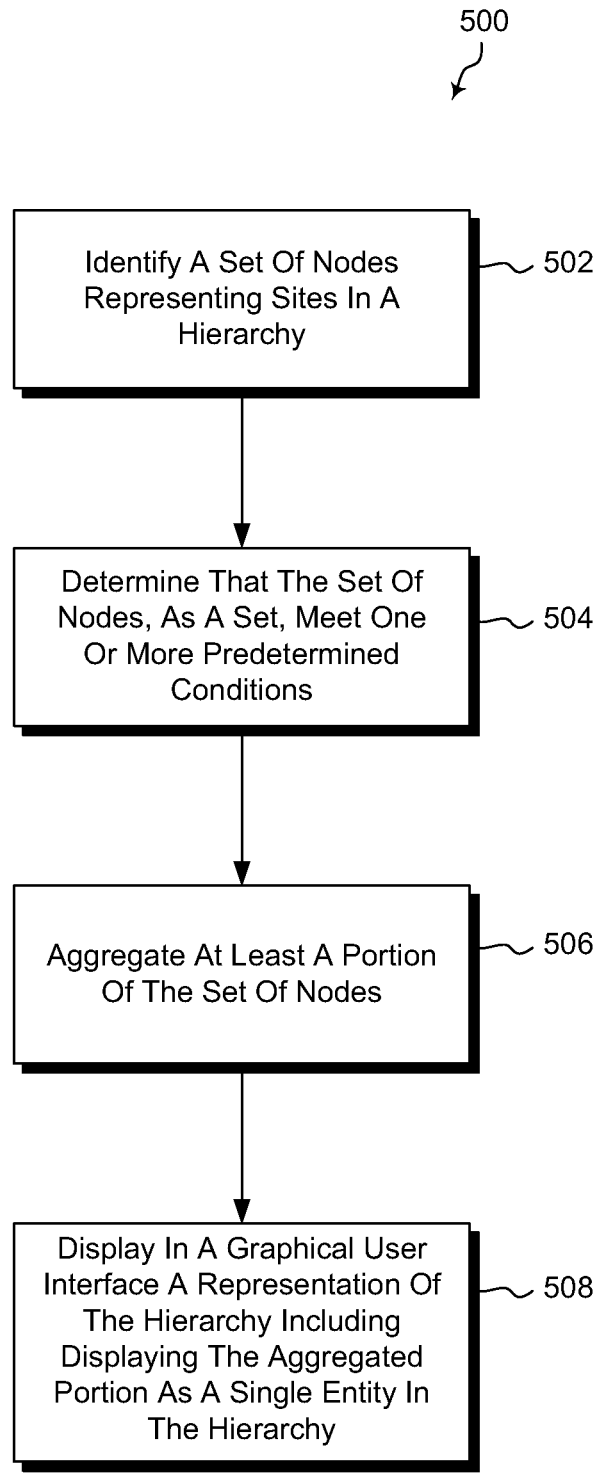
FIG. 5 illustrates a method of displaying a hierarchy.

Referring now to FIG. 5, a method 500 is illustrated. The method 500 may be practiced in a computing environment and includes acts for displaying a hierarchy. The method 500 includes identifying a set of nodes representing nodes in a hierarchy act 502. The set of nodes share one or more common characteristics not shared by any other nodes in the hierarchy. For example, as illustrated in FIG. 1A, nodes S02 and S03 share the common characteristic of being children nodes of P01. Additionally, there are five nodes (not shown) that are children nodes of node P01.

The method 500 further includes determining that the set of nodes, as a set, meet one or more predetermined conditions (act 504). In the examples illustrated previously, the predetermined condition(s) may include a number threshold. For example, the set may have a threshold number of nodes in the set.

As a result of the nodes sharing the one or more common characteristics not shared by any other nodes in the hierarchy and as a result of the set meeting the predetermined condition(s), the method 500 further includes aggregating at least a portion of the set of nodes (act 506). For example, FIG. 1A illustrates the aggregation node 106 which is an aggregation of five child nodes to node P02 as a result of the five nodes being child nodes of node P02 and the number of nodes meeting or exceeding a threshold of five nodes.

The method 500 further includes displaying in a graphical user interface a representation of the hierarchy including displaying the aggregated portion as a single entity in the hierarchy (act 508). FIG. 1A illustrates displaying the aggregation node 106 in a graphical user interface.

The method 500 may be practiced where the one or more common characteristics not shared by any other nodes in the hierarchy includes the nodes sharing the same hierarchical parent. An example of this is illustrated by the aggregation node 106 in FIG. 1A. In this example, the five nodes represented by the aggregation node 106 share the same parent P02.

The method 500 may be practiced where the predetermined condition includes the number of nodes in the set of nodes meeting or exceeding a predetermined threshold number of nodes. In the example shown in FIG. 1A, the threshold may be five. Thus, the five nodes represented by the aggregation node, as a set, meet the predetermined condition to me represented by the single entity.

The method 500 may be practiced where the single entity is a graphical representation of a plurality of hardware devices, or a graphical representation of other entities, such as software or hardware entities. For example, FIG. 1A illustrates the aggregation node 106 as a single drawing of two computer systems. However, the drawing of the aggregation node 106 may be nonetheless a single entity in that a single graphic file is used. In other embodiments, the delineation of a single entity may include borders, substantial overlap of device representation (such as is shown in FIG. 1A where the two device representations shown in the aggregation node 106 have more than mere incidental contact, but rather have substantially overlapping portions), shading, specialized coloration, etc.

The method 500 may further include displaying a user interface element for pinning associated with a node in the set of nodes. For example, as illustrated in FIG. 2, a user interface element for pinning 114 shown as a pushpin graphic may be shown. The user interface element may be able to be interacted with by a user. Thus, the method 500 may further include receiving user input at the user interface element for pinning indicating that the node is pinned. In some embodiments, this may cause the method 500 to further include excluding the pinned node from the aggregated portion and displaying the pinned node along with the single entity in the hierarchy. FIG. 2 illustrates an example of this where the aggregation node 106 is illustrated with the pinned node 112.

The method 500 may further include displaying the hierarchy overlaid on a geographic map such that hierarchy nodes are shown in about the geographical location that the nodes exist. An example of this functionality is illustrated in FIG. 3. FIG. 3 illustrates a hierarchy 304 overlaid on a map. Various nodes of the hierarchy 304 are illustrated overlaid onto various geographic locations that may represent an approximate (or exact) location of computer hardware associated with the nodes.

The method 500 may further include receiving user input at the user interface directed towards the single entity, such as for example user input directed at the aggregation node 106. For example, receiving user input may include receiving user input selecting a link displayed in an information box associated with the single entity. As a result of the user input, the method 500 may further include displaying information about individual nodes represented by the aggregated portion.

In some embodiments of the method 500, displaying information about individual nodes represented by the aggregated portion includes displaying a list view of the nodes represented by the aggregate portion. In some embodiments, displaying information about individual nodes represented by the aggregated portion includes dis-aggregating the aggregated portion such that nodes representing the individual nodes represented by the aggregated portion are displayed in the hierarchy. For example, in FIG. 1A, the aggregation node 106 may be interacted with in a way to cause individual nodes to be represented, similar to how the nodes S02 and S03 are represented in FIG. 1A.

In some embodiments of the method 500, the method 500 may further include receiving user input at the user interface directed towards the single entity. As a result of the user input, the method 500 further includes displaying summarized information about the nodes represented by the aggregated portion. For example, the user input may include hovering over or near the single entity, such as hovering a cursor over the aggregation node 106 illustrated in FIG. 1A. Displaying summarized information about the nodes represented by the aggregated portion may include displaying aggregated health information for the nodes represented by the aggregated portion.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of displaying a hierarchy, the method comprising:
    identifying a set of nodes in a hierarchy, wherein the set of nodes share one or more common characteristics not shared by any other nodes in the hierarchy;
    determining that the set of nodes, as a set, meet a predetermined condition;
    as a result of the nodes sharing the one or more common characteristics not shared by any other nodes in the hierarchy and as a result of the set meeting the predetermined condition, aggregating at least a portion of the set of nodes;
    displaying in a graphical user interface a representation of the hierarchy including displaying the aggregated portion as a single entity in the hierarchy, the single entity being represented by a graphical object that includes an information box, the information box displaying summarizing information corresponding to a plurality of different nodes aggregated into the aggregated portion, such that the summarizing information is displayed without dis-aggregating the aggregated portion, the displaying of the summarizing information within the information box occurring prior to a user interacting with the graphical object, the summarizing information including at least one of an error status, a warning status or an operating status;
    displaying a user interface element for pinning;
    receiving user input at the user interface element for pinning a particular node that is determined to meet the predetermined condition and that is included in the aggregated portion, the input indicating that the particular node is pinned;
    in response to the input indicating that the particular node is pinned, causing the pinned node to be excluded from the aggregated portion, even while displaying the aggregated portion, such that the aggregated portion only includes nodes that are not pinned; and
    displaying the pinned node next to the graphical object representing the single entity in the hierarchy, such that pinning of the particular node causes the representation of the hierarchy to be displayed differently than when the particular node is not pinned.

2. The method of claim 1, wherein the one or more common characteristics not shared by any other nodes in the hierarchy comprises the nodes sharing the same hierarchical parent.

3. The method of claim 1, wherein the predetermined condition comprises the number of nodes in the set of nodes meeting or exceeding a predetermined threshold number of nodes.

4. The method of claim 1, wherein the single entity is a graphical representation of a plurality of hardware devices.

5. The method of claim 1, further comprising displaying the hierarchy overlaid on a geographic map such that hierarchy nodes are shown in about the geographical location that systems represented by the nodes exist.

6. The method of claim 1, further comprising displaying the hierarchy overlaid on at least one of a building map or a datacenter server map.

7. The method of claim 1, further comprising:
    receiving user input at the user interface directed towards the single entity;
    as a result of the user input, displaying information about individual nodes represented by the aggregated portion.

8. The method of claim 7, wherein receiving user input comprises receiving user input selecting a link displayed in an information box associated with the single entity.

9. The method of claim 7, wherein displaying information about individual nodes represented by the aggregated portion comprises displaying a list view of the nodes represented by the aggregate portion.

10. The method of claim 7, wherein displaying information about individual nodes represented by the aggregated portion comprises dis-aggregating the aggregated portion such that nodes represented by the aggregated portion are displayed in the hierarchy.

11. The method of claim 1, further comprising:
    receiving user input at the user interface directed towards the single entity to configure all nodes represented by the single entity by configuring the single entity.

12. The method of claim 1, further comprising:
    receiving user input at the user interface directed towards the single entity;
    as a result of the user input, displaying summarized information about the nodes represented by the aggregated portion.

13. The method of claim 12, wherein the user input comprises hovering over or near the single entity.

14. The method of claim 12, wherein displaying summarized information about the nodes represented by the aggregated portion comprises displaying aggregated health information for systems represented by the aggregated portion.

15. The method of claim 1, further comprising receiving user input in the form of metadata, wherein the metadata defines the one or more common characteristics.

16. The method of claim 1, wherein the one or more common characteristics are programmatically determined.

17. One or more recordable-type storage device storing computer executable instructions that when executed by one or more processors cause the one or more processors to perform the following:
    identifying a set of nodes in a hierarchy, wherein the set of nodes share one or more common characteristics not shared by any other nodes in the hierarchy;
    determining that the set of nodes, as a set, meet a predetermined condition;
    as a result of the nodes sharing the one or more common characteristics not shared by any other nodes in the hierarchy and as a result of the set meeting the predetermined condition, aggregating at least a portion of the set of nodes;
    displaying in a graphical user interface a representation of the hierarchy including displaying the aggregated portion as a single entity in the hierarchy, the single entity being represented by a graphical object that includes an information box, the information box displaying summarizing information corresponding to a plurality of different nodes aggregated into the aggregated portion, such that the summarizing information is displayed without dis-aggregating the aggregated portion, the displaying of the summarizing information within the information box occurring prior to a user interacting with the graphical object, the summarizing information including at least one of an error status, a warning status or an operating status;
    displaying a user interface element for pinning;
    receiving user input at the user interface element for pinning a particular node that is determined to meet the predetermined condition and that is included in the aggregated portion, the input indicating that the particular node is pinned;
    in response to the input indicating that the particular node is pinned, causing the pinned node to be excluded from the aggregated portion, even while displaying the aggregated portion, such that the aggregated portion only includes nodes that are not pinned; and
    displaying the pinned node next to the graphical object representing the single entity in the hierarchy, such that pinning of the particular node causes the representation of the hierarchy to be displayed differently than when the particular node is not pinned.

18. The one or more storage device of claim 17, wherein the method further includes:
    displaying a plurality of interactive links between different nodes in the hierarchy, including at least one interactive link that represents a connection status between the single entity that represents the aggregated portion and at least one other node in the hierarchy, wherein the interactive link, when selected, causes a tooltip to be displayed that provides connectivity information about the connection status and wherein the interactive link is displayed in a first format when the connection status has one or more errors and in a second format when the connection status is without the one or more errors.

19. In a computing environment, a system for displaying a hierarchy, the system comprising:
    at least one processor;
    a data source layer, wherein the data source layer comprises one or more data sources including one or more data storage devices which store information about clients and services in a system;
    a data provider layer, wherein the data provider layer comprises one or more computer modules used to abstract differences between data sources in the data source layer;
    a presentation layer, wherein the presentation layer comprises one or more modules, including a user interface technology, configured to perform the following:
        identifying a set of nodes in a hierarchy, wherein the set of nodes share one or more common characteristics not shared by any other nodes in the hierarchy;
        determining that the set of nodes, as a set, meet a predetermined condition;
        as a result of the nodes sharing the one or more common characteristics not shared by any other nodes in the hierarchy and as a result of the set meeting the predetermined condition, aggregating at least a portion of the set of nodes;
        displaying in a graphical user interface a representation of the hierarchy including displaying the aggregated portion as a single entity in the hierarchy, the single entity being represented by a graphical object that includes an information box, the information box displaying summarizing information corresponding to a plurality of different nodes aggregated into the aggregated portion, such that the summarizing information is displayed without dis-aggregating the aggregated portion, the displaying of the summarizing information within the information box occurring prior to a user interacting with the graphical object, the summarizing information including at least one of an error status, a warning status or an operating status;
        displaying a user interface element for pinning;
        receiving user input at the user interface element for pinning a particular node that is determined to meet the predetermined condition and that is included in the aggregated portion, the input indicating that the particular node is pinned;
        in response to the input indicating that the particular node is pinned, causing the pinned node to be excluded from the aggregated portion, even while displaying the aggregated portion, such that the aggregated portion only includes nodes that are not pinned; and
        displaying the pinned node next to the graphical object representing the single entity in the hierarchy, such that pinning of the particular node causes the representation of the hierarchy to be displayed differently than when the particular node is not pinned and
    at least one storage medium storing the data source layer, the data provider layer and the presentation layer.

20. The system of claim 19, wherein the data provider layer comprises one or more of: one or more databases; one or more file shares; or one or more services.

21. The system of claim 19, wherein the first format comprises a broken or dashed line or curve and the second format comprises a solid line or curve.

* * * * *